US010475057B2

(12) United States Patent
Marshall et al.

(10) Patent No.: US 10,475,057 B2
(45) Date of Patent: Nov. 12, 2019

(54) SYSTEM AND METHOD FOR TRANSACTION VOLUME DETERMINATION

(71) Applicant: American Express Travel Related Services Company, Inc., New York, NY (US)

(72) Inventors: Vernon Marshall, London (GB); Houman Motaharian, Glen Rock, NJ (US); Ashish Kapatia Sharma, Jersey City, NJ (US); Harry Singh, Hoboken, NH (US); Ashwin Srinivasachary, Jersey City, NJ (US); Chao Yuan, New York, NY (US)

(73) Assignee: AMERICAN EXPRESS TRAVEL RELATED SERVICES COMPANY, INC., New York, NY (US)

( * ) Notice: Subject to any disclaimer, the term of this patent is extended or adjusted under 35 U.S.C. 154(b) by 905 days.

(21) Appl. No.: 14/987,040

(22) Filed: Jan. 4, 2016

(65) Prior Publication Data

US 2017/0193534 A1 Jul. 6, 2017

(51) Int. Cl.
| | |
|---|---|
| *G06Q 30/02* | (2012.01) |
| *G06Q 10/06* | (2012.01) |
| *G06N 20/00* | (2019.01) |
| *G06F 16/9535* | (2019.01) |
| *G06F 16/2457* | (2019.01) |

(52) U.S. Cl.
CPC ... *G06Q 30/0202* (2013.01); *G06F 16/24578* (2019.01); *G06F 16/9535* (2019.01); *G06N 20/00* (2019.01); *G06Q 10/067* (2013.01); *G06Q 30/0201* (2013.01)

(58) Field of Classification Search
CPC .................................................. G06Q 30/0202
See application file for complete search history.

(56) References Cited

U.S. PATENT DOCUMENTS

| | | | |
|---|---|---|---|
| 8,062,219 B2 * | 11/2011 | Stupp ...................... | G06F 17/18 600/300 |
| 2009/0240574 A1 * | 9/2009 | Carpenter .............. | G06Q 40/06 705/36 R |
| 2015/0170077 A1 * | 6/2015 | Kara .................. | G06F 17/30554 705/7.38 |
| 2017/0024663 A1 * | 1/2017 | Liu ...................... | G06N 99/005 |

* cited by examiner

*Primary Examiner* — Alan S Miller
*Assistant Examiner* — Arif Ullah
(74) *Attorney, Agent, or Firm* — Snell & Wilmer, L.L.P.

(57) ABSTRACT

Systems and methods of improving the operation of a transaction network and transaction network devices is disclosed. A business size arbitration network host may comprise various modules and engines as discussed herein wherein the size of the business (e.g., aggregate value of sales) may be identified as being relatively large, whereby the transaction network may tailor the handling of a transaction of the business, such as by adjusting handling speed, fees, etc., whereby the transaction network may actively encourage use of transaction products and services by relatively large businesses, and/or such as by delivering value-added services, such as electronically provided advertisements and/or offers, and/or other credit and/or lending products, whereby the transaction network more properly functions according to approved parameters.

18 Claims, 8 Drawing Sheets

| High Sales Indicators | Depository Institutions/ Insurance Carriers (315-1) | Retail/General Merchandise (315-2) | Manufacturing (315-3) | | | Wholesale Trade Durable (315-4) | Legal Services (315-5) |
|---|---|---|---|---|---|---|---|
| Employees (310-1) | ✗ | ✓ | ✓ | . | . | ✓ | ✗ |
| Square Footage (310-2) | ✗ | ✓ | ✓ | . | . | ✓ | ✗ |
| UCC Filings (310-3) | ✓ | ✗ | ✓ | . | . | ✗ | ✗ |
| Assets (310-4) | . | . | . | . | . | . | . |
| Payment Experiences (310-5) | . | . | . | . | . | . | . |
| Net worth (310-6) | . | . | . | . | . | . | . |
| Argus CV (310-7) | ✓ | ✗ | ✓ | . | . | ✗ | ✗ |
| Available Credit (310-8) | ✓ | ✓ | ✓ | . | . | ✓ | ✓ |

| Variables | IMPORTANCE |
|---|---|
| Employees | 100 |
| Payment Experiences | 70 |
| Industry Index | 31 |
| Sales Amt Factor | 30 |
| Max Available Credit | 28 |
| Average Available Credit | 21 |
| Satisfactory Payment Experiences | 18 |
| Square Footage | 11 |
| Argus CV | 10 |
| IXI Assets | 9 |
| UCC Filings | 9 |
| Payment References | 7 |
| High Sales Presence Indicator | 5 |
| Legal Status | 2 |
| Enigma Match Indicator | 2 |

SYSTEM AND METHOD FOR TRANSACTION VOLUME DETERMINATION

FIELD

The present disclosure relates to data analytics for transaction data.

BACKGROUND

Large data sets may exist in various sizes and with various levels of organization. With big data comprising data sets as large as ever, the volume of data collected incident to the increased popularity of online and electronic transactions continues to grow. Billions of rows and hundreds of thousands of columns worth of data may populate a single table, for example. An example of the use of big data is in identifying and categorizing the relative standing (e.g., relative size) of a business relative to other businesses in its industry, which is frequently a key priority for transaction account issuers. Transactions processed by the transaction account issuer are massive in volume and comprise tremendously large data sets.

Due to significant informational deficiencies, private business opacity, and relative variations in transaction volumes among different industries, data establishing both objective and relative transaction volume and relative business size are incomplete and inaccurate. This data gap confuses and frustrates the identification and categorization of transaction data and related businesses, and obscures the identity and categorization of real-world entities and individuals behind transactions, while also hampering data analytics.

SUMMARY

In accordance with various embodiments, a business size arbitration network host and an industry indexed factor analysis module may be in communication with a processor and configured to predict a sales value of a business in response to data element source data. In various embodiments, the industry indexed factor analysis module predicts the sales value in response to evaluating and ranking of the business according to industry-relevant factors assigned industry-dependent weights.

A business size arbitration network host is disclosed. The business size arbitration network host may include a processor, a tangible, non-transitory memory configured to communicate with the processor, the tangible, non-transitory memory having instructions stored thereon that, in response to execution by the processor, cause the processor to perform operations. The business size arbitration network host may include an industry indexed factor analysis module in communication with the processor and configured to evaluate and rank of the business according to industry-relevant factors assigned industry-dependent weights, and a GBM model empirically-determined variable set analysis module in communication with the processor, the industry indexed factor analysis module, and a master size arbitration module and configured to predict the sales value of the business in response to the data element source data and in response to the industry indexed factor analysis module.

In various embodiments, the GBM model empirically-determined variable set analysis module predicts the sales value in response to evaluating and ranking of non-pre-determined factors ascertained by retrospective machine learning analysis in response to ingesting at least one of the data element source data and the evaluation and ranking of the business by the industry indexed factor analysis module according to industry-relevant factors assigned industry-dependent weights, crafting a prediction of the relative ranking of the business in response to at least one of the data element source data, and the evaluation and ranking of the business by the industry indexed factor analysis module according to industry-relevant factors assigned industry-dependent weights, and comparing the prediction that to a third party data source.

In various embodiments, the industry indexed factor analysis module further includes an industry categorization engine configured to ingest the data element source data and generate an industry categorization array comprising industry categories and a variable array comprising variables, an industry-linked variable comparator configured to compare a relative value of the variable array of the business within the industry categorization array and configured to provide at least one of an industry-linked variable ranking or an industry-linked variable threshold to a value decisioner. In various embodiments the value decisioner is configured to correlate the relative value of the variable array and the industry categorization array and rank the business within an industry category according to the sales value, wherein the industry categorization engine delivers the industry categorization array to the value decisioner on an industry categorization array bus, and wherein the industry categorization engine delivers the variable array to the industry-linked variable comparator on a variable array bus.

In various embodiments, the industry categorization array includes a plurality of industry categories. In various embodiments, the plurality of industry categories includes at least two of a group including depository institutions/insurance carriers, retail/general merchandise, manufacturing, wholesale trade durable, and legal services. In various embodiments, the variable array includes a plurality of variables that depict high sales value in one or more of the plurality of industry categories.

In various embodiments, the plurality of variables includes at least two of a group including employees, square footage, UCC filings, assets, payment experiences, net worth, Argus CV, and available credit.

In various embodiments, the GBM model empirically-determined variable set analysis module includes a GBM model variable determiner configured to ingest data and generate a GBM model variable array including a plurality of GBM variables. In various embodiments, the GBM model empirically-determined variable set analysis module includes a GBM model variable ranker configured to ingest the GBM model variable array and sequence the plurality of GBM variables, wherein the GBM model variable ranker associates an importance factor with each GBM variable, whereby a parallel GBM model variable importance array comprising a plurality of GBM model variable importance values is assembled.

In various embodiments, the GBM model empirically-determined variable set analysis module includes a GBM model variable evaluator configured to assess the GBM model variable array and GBM model variable importance array and configured to calculate a business size prediction in response to a magnitude of at least one GBM variable weighted by at least one GBM model variable importance value, and a value modeler configured to assign the sales value to the business indicative of a size of the business in response to the GBM model variable evaluator.

In various embodiments, the business size arbitration network host further includes an aggregate transaction value analysis module includes a third party data source sales determiner configured to add up aggregate transaction values from third-party data sources that are indicated to be transactions associated with the business and determine whether the transactions sum to a sales value floor, and wherein the business size arbitration network host selects between the GBM model empirically-determined variable set analysis module and the aggregate transaction value analysis module.

A business size arbitration network is disclosed. The business size arbitration network may include a business size arbitration network host configured to predict a sales value of a business in response to evaluating and ranking of the business according to industry-relevant factors assigned industry-dependent weights, wherein the business size arbitration network host directs data to be stored. The business size arbitration network may include a distributed storage system having a plurality of nodes, the distributed storage system configured to direct data to the business size arbitration network host, in response to the evaluating and ranking of the business by the business size arbitration network host. The business size arbitration network may include a telecommunications transfer channel including a network logically connecting the business size arbitration network host to the distributed storage system.

A method of industry-indexed factor analysis may include ingesting, by an industry categorization engine of a business size arbitration network host, data element source data. The method may include generating, by the industry categorization engine, an industry categorization array including industry categories. The method may include generating, by the industry categorization engine, a variable array including variables. The method may include comparing, by an industry-linked variable comparator, a relative value of the variable array of a business within the industry categorization array. The method may include providing, by the industry-linked variable comparator, at least one of an industry-linked variable ranking and/or an industry-linked variable threshold, to a value decisioner in response to the comparing. The method may include correlating, by the value decisioner, the relative value of the variable array and the industry categorization array. The method may include ranking, by the value decisioner, the business within an industry category according to the sales value, and in response to the correlating.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may be obtained by referring to the detailed description and claims when considered in connection with the drawing figures, wherein like numerals denote like elements.

DETAILED DESCRIPTION

The detailed description of various embodiments herein makes reference to the accompanying drawings and pictures, which show various embodiments by way of illustration. While these various embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

Figure 1A:
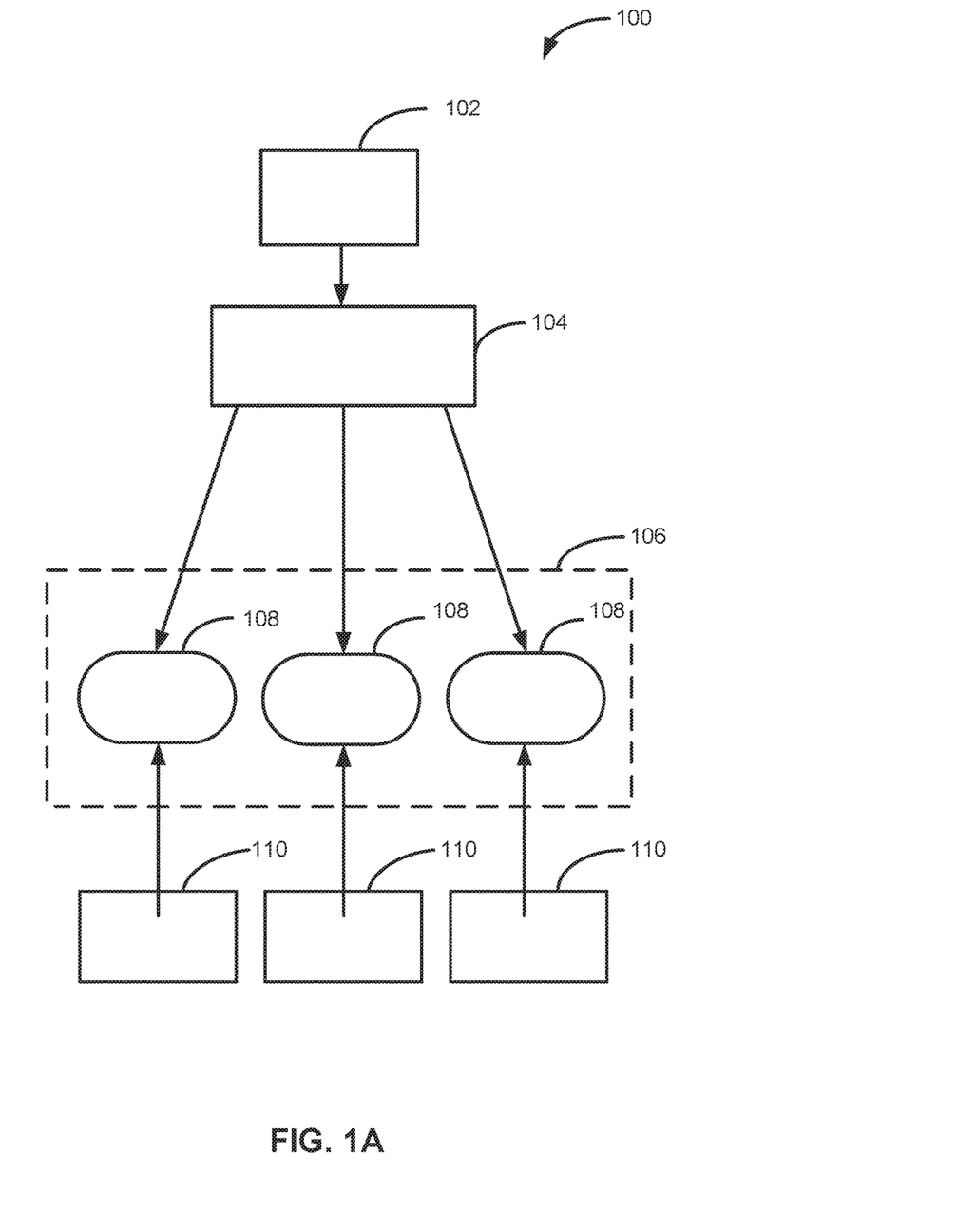
FIG. 1A illustrates an exemplary system for distributed storage and distributed processing, in accordance with various embodiments.

With reference to FIG. 1, system 100 for distributed data storage and processing is shown, in accordance with various embodiments. System 100 may comprise a business size arbitration network host 102. Business size arbitration network host 102 may comprise any device capable of receiving and/or processing an electronic message via telecommunications transfer channel 104. Telecommunications transfer channel 104 may comprise a network. Business size arbitration network host 102 may take the form of a computer or processor, or a set of computers/processors, although other types of computing units or systems may be used, including laptops, notebooks, hand held computers, personal digital assistants, cellular phones, smart phones (e.g., iPhone®, BlackBerry®, Android®, etc.) tablets, wearables (e.g., smart watches and smart glasses), or any other device capable of receiving data over telecommunications transfer channel 104.

As used herein, the term "network" includes any cloud, cloud computing system or electronic communications system or method which incorporates hardware and/or software components. Communication among the parties may be accomplished through any suitable communication channels, such as, for example, a telephone network, an extranet, an intranet, Internet, point of interaction device (point of sale device, personal digital assistant (e.g., iPhone®, Blackberry®), cellular phone, kiosk, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Moreover, although the system is frequently described herein as being implemented with TCP/IP communications protocols, the system may also be implemented using IPX, Appletalk, IP-6, NetBIOS, OSI, any tunneling protocol (e.g. IPsec, SSH), or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein. See, for example, DILIP NAIK, INTERNET STANDARDS AND PROTOCOLS (1998); JAVA 2 COMPLETE, various authors, (Sybex 1999); DEBORAH RAY AND ERIC RAY, MASTERING HTML 4.0 (1997); and LOSHIN, TCP/IP CLEARLY EXPLAINED (1997) and DAVID GOURLEY AND BRIAN TOTTY, HTTP, THE DEFINITIVE GUIDE (2002), the contents of which are hereby incorporated by reference.

A network may be unsecure. Thus, communication over the network may utilize data encryption. Encryption may be performed by way of any of the techniques now available in the art or which may become available—e.g., Twofish, RSA, El Gamal, Schorr signature, DSA, PGP, PM, GPG (GnuPG), and symmetric and asymmetric cryptography systems.

In various embodiments, business size arbitration network host 102 may interact with distributed storage system 106 for storage and/or processing of big data sets. As used herein, big data may refer to partially or fully structured, semi-structured, or unstructured data sets including millions of rows and hundreds of thousands of columns. A big data set may be compiled, for example, from a history of purchase transactions over time, from web registrations, from social media, from records of charge (ROC), from summaries of charges (SOC), from internal data, or from other suitable sources. Big data sets may be compiled without descriptive metadata such as column types, counts, percentiles, or other interpretive-aid data points.

In various embodiments, distributed storage system 106 may comprise one or more nodes 108. Nodes 108 may comprise computers or processors the same as or similar to business size arbitration network host 102. Nodes 108 may be distributed geographically in different locations, housed in the same building, and/or housed in the same rack. Nodes 108 may also be configured to function in concert to provide storage space and/or processing power greater than one of a node 108 might provide alone. As a result, distributed storage system 106 may collect and/or store the data 110. Data 110 may be collected by nodes 108 individually and compiled or in concert and collated. Data 110 may further be compiled into a data set and formatted for use.

In various embodiments, data 110 may comprise a collection of data including and/or originating from cardholder information, transaction information, account information, record of sales, account history, customer history, sensor data, machine log data, data storage system, public web data, and/or social media. Data 110 may be collected from multiple sources and amalgamated into a big data structure such as a file, for example. In that regard, the data may be used as an input to generate metadata describing the big data structure itself, as well as the data stored in the structure.

The distributed storage system 106 may comprise a transaction network. A business size arbitration network host 102 may comprise various modules and engines as discussed herein wherein the probability that a transaction is executed by an individual or entity comprising a relatively large business as compared to other businesses within that businesses industry. The meaning of "relatively large" is relative to the typical norms of an industry and is flexibly determinable by the host 102, as discussed herein. For instance, relatively large may mean within the top 25 percent of sales volume or value within an industry, or may mean within the top 10 percent of sales volume or value within an industry, or any other sales metric as desired. Relatively large may mean within the top 25 percent of employees in an industry, or may mean within the top 10 percent number of employees within an industry, or any other employment metric as desired. Relatively large may mean within the top 25 percent of revenue within an industry or within the top 10 percent of revenue within an industry, or any other revenue metric as desired. Moreover, and as will be apparent herein, various industries may ascribe various weights to various other metrics whereby a business may be said to be relatively large within that industry. Thus, relatively large may mean within the top 25 percent of all businesses within an industry, according to an industry-valuable metric and/or a weighted average of industry-valuable metrics, or similarly within the top 10 percent, or any other metric as applicable. A business may be identified as being relatively large, whereby the transaction network may tailor the handling of a transaction of the business, such as by adjusting handling speed, fees, etc., whereby the transaction network may actively encourage use of transaction products and services by relatively large businesses, and/or such as by delivering value-added services, such as electronically provided advertisements and/or offers, and/or other credit and/or lending products, whereby the transaction network more properly functions according to approved parameters.

Moreover, such identifications enhance credit risk discrimination, identification of businesses and consumers associated with a business organization who may presently be consumer cardholders, whereby business-oriented transactions cards may be provided to them. Such identifications enable the promotion of relevant merchants to relevant cardholders such as to promote business-to-business relationship building and/or potential business-to-business relationships.

In various embodiments, such determinations involve multiple complex and interactive machine steps. For instance, by evaluating the data 110 at a transaction level, assessing the nature of a transaction at the individual transaction level provides sufficient granularity. Data may be evaluated at the transaction level and/or aggregated such as to determine if a merchant or any other transaction party may be identified as a large business. Moreover, such identification may be combined with or enhance the identification of such aspects as card product type, merchant industry codes, transaction amounts, number of transactions by an individual or a business in an industry, or at a particular merchant in an industry, determination of gross sales, removal of noise inducing transactions, and controlling for transactions having similar profiles, such as to facilitate further data processing. Determinations may further leverage text mining on names and addresses to identify large businesses and/or to model business sales volume and machine learning methodologies, such as gradient boosting decision trees, to identify the non-linear patterns of behavior exhibited by parties.

Figure 1B:
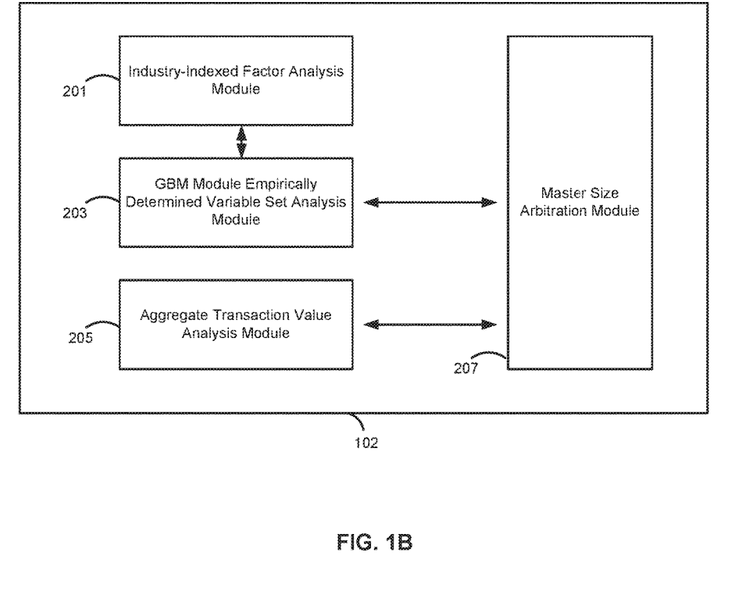
FIG. 1B illustrates an exemplary business size arbitration network host component of a system according to FIG. 1A, in accordance with various embodiments.

In various embodiments, and with reference to FIG. 1B, a business size arbitration network host 102 is described in more particular detail. For instance, a business size arbitration network host 102 may comprise various logical modules configured to perform various operations and processes in accordance with methods disclosed herein.

A business size arbitration network host 102 may comprise a data element source set comprised within the data 110 from nodes 108 of distributed storage system 106. In further embodiments, the business size arbitration network host 102 may not comprise a data element source set, but may receive a data element source set from nodes 108 of the distributed storage system 106, the data element source set comprised within the data 110 form nodes 108.

A business size arbitration network host 102 may predict the aggregate transaction value of all transactions at a business based on data element source data 110 ("sales value"). In various embodiments, the business size arbitration network host 102 may further adapt these predictions over time in response to machine learning, such as may be useful as the business size arbitration network host 102 learns what data is more or less important to accurate predictions, based on iterative prediction, and evaluation of the outcome of predictions.

A business size arbitration network host 102 may determine predictions according to a variety of mechanisms, for instance, an industry-indexed factor analysis module 201, a GBM model empirically-determined variable set analysis module 203, and an aggregate transaction value analysis module 205. One or more such module 201, 203, and 205 may provide a sales value prediction for a business. The business size arbitration network host 102 may further comprise a master size arbitration module 207 configured to select the one such sales value prediction, and/or blend multiple such sales value predictions, and provide an output to an electronic network.

As mentioned, a business size arbitration network host 102 may comprise an industry-indexed factor analysis module 201. An industry-indexed factor analysis module 201 may complete operations and processes, such as in accordance with machine learning methods, whereby a sales value is predicted in response to evaluation and ranking of the business according to industry-relevant factors, each factor being assigned an industry-dependent weight. More specifically, an industry-indexed factor analysis module 201 may determine industry-relevant factors and assign industry-dependent weights to the industry-relevant factors, and communicate this determination and assignment to a GBM model empirically-determined variable set analysis module 203, discussed herein. For instance, some factors may be more relevant to some industries than others (e.g., employee number may be more relevant to a staffing agency than to an automated manufacturing industry) and some factors may be more heavily weighted in some industries than others (e.g., employee number may weigh more heavily in favor of law firm revenues and less heavily or even negatively against software-as-a-service provider revenues).

A business size arbitration network host 102 may comprise a GBM model empirically-determined variable set analysis module 203. A GBM model empirically-determined variable set analysis module 203 may complete operations and processes, such as in accordance with machine learning methods, whereby a sales value is predicted in response to evaluation and ranking of non-pre-determined factors ascertained by retrospective machine learning analysis, such as by ingesting data, making predictions as to the relative ranking of businesses, then comparing that to third party data sources. For instance, the GBM model empirically-determined variable set analysis module 203 may receive non-pre-determined factors ascertained by retrospective machine learning analysis from the industry-indexed factor analysis module 201 and/or third party data sources. The module 203 may itself identify non-pre-determined factors ascertained by retrospective machine learning analysis and may compare to factors derived in response to third party data sources, for instance, derived by the industry-indexed factor analysis module 201 in response to third party data. Thus, the GBM model empirically-determined variable set analysis module 203 may determine its own factors and weights according to machine learning, and/or may enjoy awareness of pre-determined factors and weights provided by the industry-indexed factor analysis module 201. In this manner, the sales value prediction may be improved.

Finally, a business size arbitration network host 102 may comprise an aggregate transaction value analysis module 205. An aggregate transaction value analysis module 205 may add up aggregate transaction values from third-party data sources that are indicated to be transactions associated with the business and/or may predict expected aggregate transaction values, and may determine whether the transactions sum to a sales value floor. Upon summing to a sales value floor, the business may be tagged with an indicator of "high sales value" or upon failing to sum to a sales value floor, with an indicator of "low sales value." Moreover, aggregate transaction values may be predicted based on retrospective machine learning analysis, such as by ingesting data, making predictions as to the relative ranking of businesses, then comparing that to third party data (or later consolidated internal data).

Figure 3A:
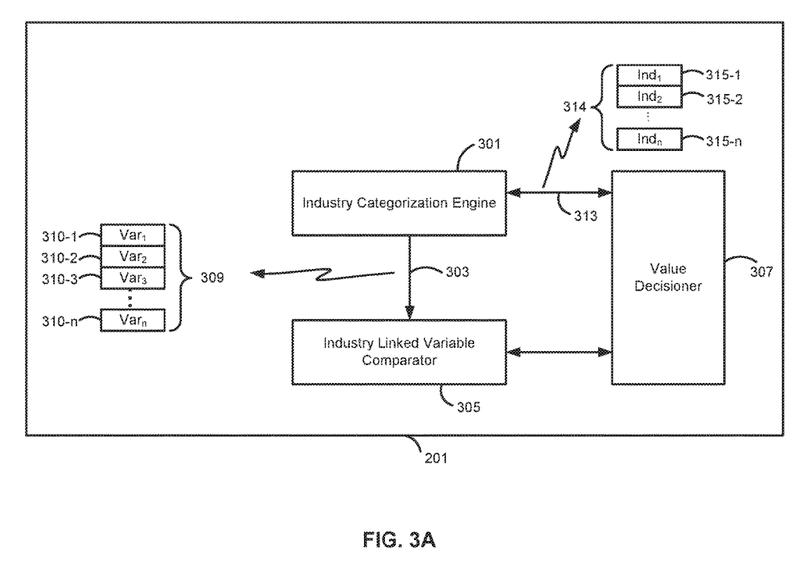
FIG. 3A illustrates an industry-indexed factor module as illustrated in FIG. 1B, in accordance with various embodiments.
Figure 3B:
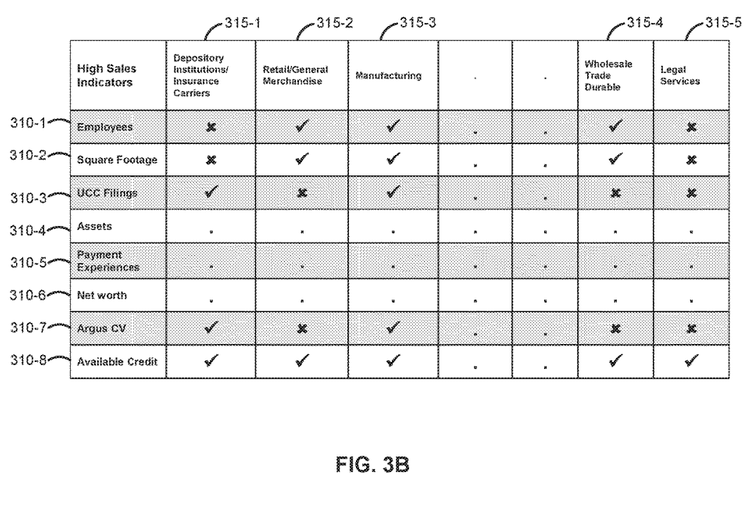
FIG. 3B illustrates an industry based index created by the module of FIG. 3A, in accordance with various embodiments.

With specific reference now to FIG. 3A-B, an industry-indexed factor analysis module 201 is discussed in additional detail. An industry-indexed factor analysis module 201 may comprise an industry categorization engine 301. The industry categorization engine 301 may ingest data 110 and may generate an industry categorization array 314 comprising a plurality of categorical industries 315, for instance a first industry category 315-1, a second industry category 315-2, a third industry category 315-3, a fourth industry category 315-4, a fifth industry category 315-5, and any number n of industry category 315-n. In various embodiments, such industry categories may comprise depository institutions/insurance carriers, retail/general merchandise, manufacturing, wholesale trade durable, legal services, and/or the like. The industry categorization array 314 may be delivered by the industry categorization engine 301 on an industry categorization array bus 313 to a value decisioner 307, as will be discussed further herein.

The industry categorization engine 301 may further ingest data 110 and may generate a variable array 209 comprising a plurality of variables that depict high sales value in one or more industry category of the industry categorization array 314. For instance, a variable array 209 may comprise a first variable 310-1 through an eighth variable 310-8, and/or any number n of variables 310-n. In various embodiments, such variables may comprise employees, square footage, UCC filings, assets, payment experiences, net worth, Argus CV (e.g., an external data source that provides Visa and MasterCard charge volumes for businesses in the United States and which may be positively correlated to sales volume), available credit, and/or the like. The variable array 209 may be delivered by the industry categorization engine 301 on variable array bus 303 to an industry-linked variable comparator 305, as will be discussed further herein.

The industry-indexed factor analysis module 201 further comprises industry-linked variable comparator 305 configured to compare the relative value of the variables 310 of the variable array 309 among multiple businesses within the industry category 315 and at least one of provide a relative ranking, or assess relative to a floor or ceiling limit value thus establishing an industry-linked variable ranking and/or threshold, respectively. The industry-linked variable comparator 305 provides such industry-linked variable ranking and/or threshold to the value decisioner 307, as will be further discussed herein.

The industry-indexed factor analysis module 201 further comprises a value decisioner 307. As mentioned, the value decisioner 307 is in communication with both the industry categorization engine 301 and the industry-linked variable comparator 305. The value decisioner 307 correlates the relative value of the variables 310 of the variable array 309 with the industry categories 315 of the industry categorization array 314 and selects only those variables 310 for each industry category 315 that are relevant for that industry category 315 (e.g., "filter" each array). In this manner, the businesses within each industry category 315 may be ranked by the value decisioner 307 based on only those variables 310 important for that industry category 315. As used herein, ranking may mean a hierarchical assembling in relative value order, or may mean a prediction of the individual businesses sales value. For instance, the value decisioner 307 may provide an output of the industry-indexed factor analysis module 201 that is received into the GBM module empirically-determined variable set analysis module 203.

Figure 2:
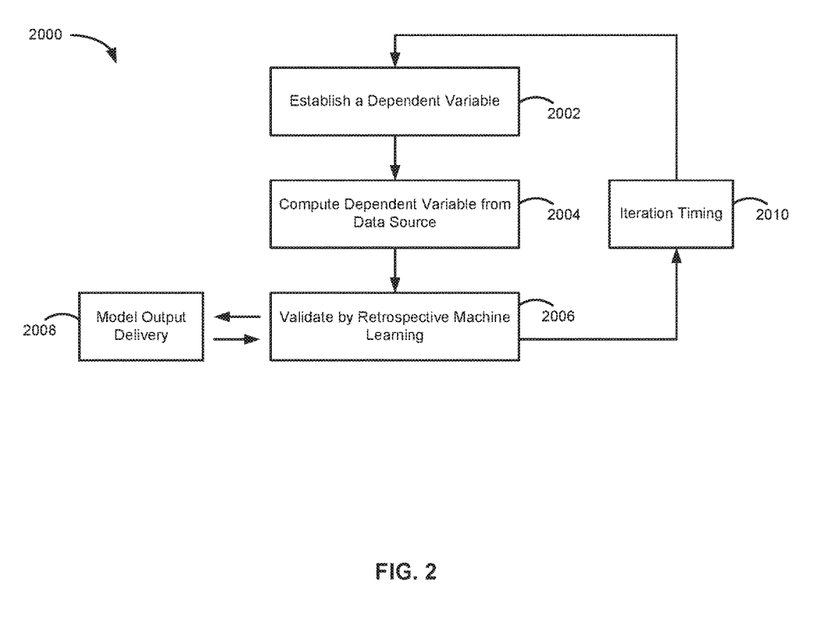
FIG. 2 illustrates an exemplary mechanism for adaptive variable determination by a business size arbitration network host of FIG. 1A, in accordance with various embodiments.

With additional reference now to FIG. 2, the value decisioner 307, industry categorization engine 301, and industry-indexed factor analysis module 201 may interoperable implement a machine learning methodology whereby the predictions of sales values may be improved. For instance a method of machine learning enhanced value decisioning 2000 may include establishment of a dependent variable (step 2002), for instance, the selection of a variable 310 believed to be relevant (e.g., dependent on) an industry category 315 (e.g., an independent variable). The method may comprise computing the dependent variable value from data sources (step 2004), for instance, data 110 may be ingested to ascertain the relative and/or individual value of the variable for a given business. The value may be tested by comparison over time to other outcomes, and/or an analogous or related value from another source (step 2006). Moreover, the value may be output, such as from the industry-indexed factor analysis module 201 to a GBM module empirically-determined variable set analysis module 203 (step 2008). Finally, an iteration timing delay (step 2010) may ensure a passage of time before a return to step 2002, whereby the method of machine learning enhanced value decisioning 2000 repeats, thus iteratively improving the output of step 2008, through the iterative step 2006. In further embodiments, various aspects of machine learning enhanced value decisioning 2000 are performed by the GBM module empirically-determined variable set analysis module 203 in cooperation with the industry-indexed factor analysis module 201.

With reference now to FIGS. 1A, 1B, 4A, and 4B, a GBM model empirically-determined variable set analysis module 203 is discussed in greater detail. A GBM model empirically-determined variable set analysis module 203 may comprise a GBM model variable determiner 409. A GBM model variable determiner 409 may ingest data 110, which may include outputs from the industry-indexed factor analysis module 201, and generate a GBM model variable array 405 comprising a plurality of GBM variables 407, for instance a first GBM variable 407-1 through a fifteenth GBM variable 407-15, and any number n of GBM variables 407-n. The GBM variables may include employees, payment experiences, industry index, sales amount factor, maximum available credit, average available credit, satisfactory payment experiences, square footage, Argus CV, IXI Assets (e.g., The total assets at zipcode level in US. This is a neighborhood variable that may be used as independent variable in a model), UCC filings, payment references, high sales presence indicators, legal status, and Enigma Match indicators (Enigma Match indicators may indicate presence of the business in an Enigma database wherein in various embodiments such presence indicates higher sales and may include data on businesses available on public/online sources, for instance, name of the business registering for marine vessels, health care data bank, import-export, hotel occupancies, green card filing, etc.), and/or the like. The GBM model variable determiner 409 determines which variables indicate high sales value and creates the GBM model variable array 405. The GBM model variable determiner 409 provides the GBM model variable array 405 via a GBM model variable array bus 403 to a GBM model variable evaluator 408, as will be further discussed herein.

Figure 4A:
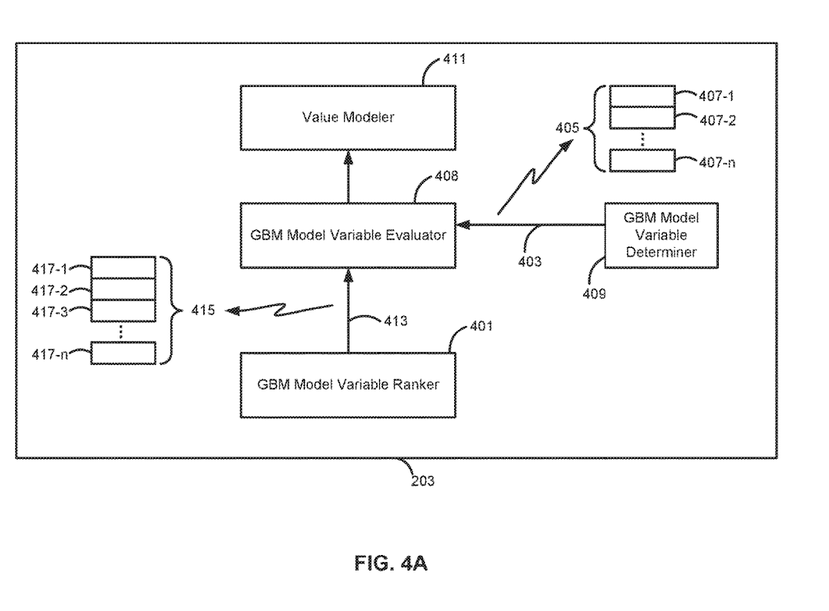
FIG. 4A illustrates a GBM model empirically-determined variable set analysis module as illustrated in FIG. 1B, in accordance with various embodiments.
Figure 4B:
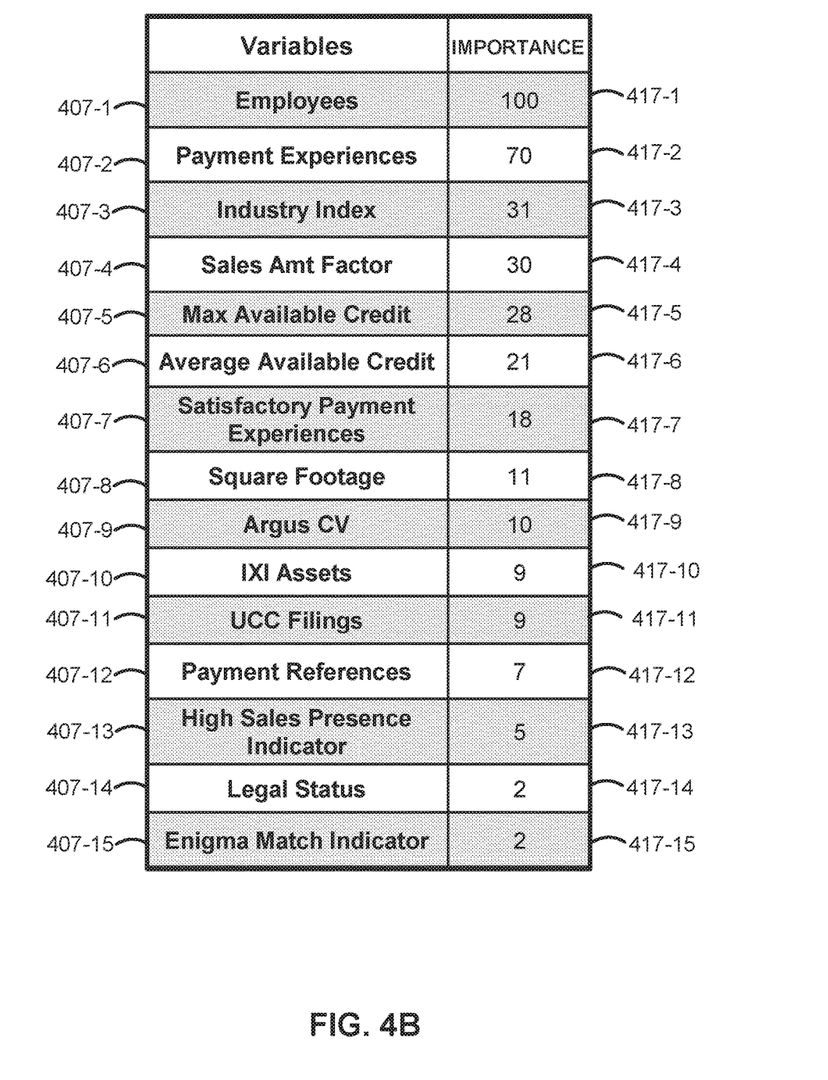
FIG. 4B illustrates a GBM modeled index created by the module of FIG. 4A, in accordance with various embodiments.

A GBM model empirically-determined variable set analysis module 203 further comprises a GBM model variable ranker 401. A GBM model variable ranker 401 sequences the variables of the GBM model variable array 405 according to a first importance factor. Stated differently, the GBM model variable ranker 401 ingests data 110 (in various embodiments including an output of the industry-indexed factor analysis module 201) and may determine the relative value of the variables to a depiction of high sales value. The variables may be ranked by an importance factor. An importance factor comprises a number between 0 and 100 with 100 being determinative and 0 being irrelevant. The GBM model variable ranker 401 ingests the GBM model variable array 405 from the GBM model variable determiner 409, and associates an importance factor with each variable 407 of the GBM model variable array 405. As such, the GBM model variable ranker 401 creates a parallel GBM model variable importance array 415 comprising a first importance value 417-1 through a fifteenth importance value 417-15 and/or any number n of importance values 417-n, each being mapped to a corresponding GBM model variable 407 of the GBM model variable array 405. The GBM model variable ranker 401 provides this array on a variable rank bus 413 to the GBM model variable evaluator 408.

The GBM model variable evaluator 408 may assess the parallel arrays of GBM model variable array 405 and GBM model variable importance array 415 and calculates a business size prediction based on the magnitude of each variable weighted by the importance of each variable. The GBM model variable evaluator 408 acquires the magnitude of each variable from data 110, performs such calculation, then interoperates with a value modeler 411.

The value modeler 411 subsequently assigns a sales value to the business indicative of the size of the business. In this manner, a GBM model empirically determined variable set analysis module 203 determines a sales value for a business. The GBM model empirically determined variable set analysis module 203 can further implement the machine learning methodology of FIG. 2, whereby the predictions of sales values may be improved. For instance a method of machine learning enhanced value decisioning 2000 may include establishment of a dependent variable (step 2002), for instance, the selection of a variable 407 believed to be relevant to (e.g., dependent on) a business (e.g., an independent variable). The method may comprise computing the dependent variable value from data sources (step 2004), for instance, data 110 may be ingested to ascertain the relative and/or individual value of the variable for a given business.

The value may be tested by comparison over time to other outcomes, and/or an analogous or related value from another source (step 2006). Moreover, the value may be output, such as from the GBM model empirically-determined variable set analysis module 203 to a master size arbitration module 207 (step 2008). Finally, an iteration timing delay (step 2010) may ensure a passage of time before a return to step 2002, whereby the method of machine learning enhanced value decisioning 2000 repeats, thus iteratively improving the output of step 2008, through the iterative step 2006.

With reference now to FIGS. 1A-B, 3A-B, 4A-B and 5, an aggregate transaction value analysis module 205 is discussed in further detail. An aggregate transaction value analysis module 205 may determine a sales value of a business. The aggregate transaction value analysis module may make such determinations in response to sales volume predictions derived from a determination of whether the sales value of the business is believed to exceed $1 million annually. As such, rather than ascertaining a variable sales value, the aggregate transaction value analysis module 205 determines a threshold value and provides a binary indication of whether the sales value of the business is or is not believed to exceed $1 million. As such, the various methods discussed herein with respect to the industry-indexed factor analysis module 201, the GBM model empirically-determined variable set analysis module 203 and/or other mechanisms may be implemented therein.

Figure 5:
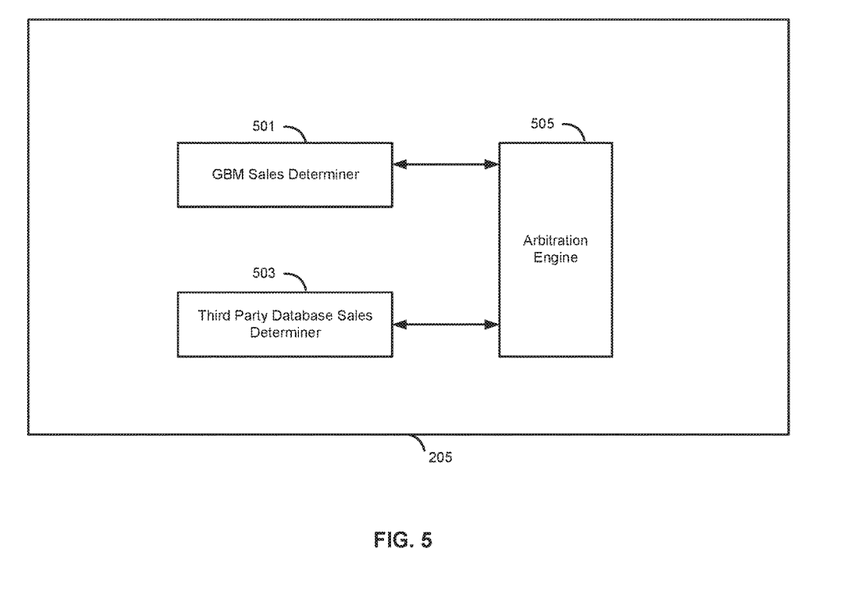
FIG. 5 illustrates an aggregate transaction value analysis module as illustrated in FIG. 1B, in accordance with various embodiments.

For instance, an aggregate transaction value analysis module 205 may comprise a GBM sales determiner 501. A GBM sales determiner 501 may comprise a GBM model empirically-determined variable set analysis module 203 to determine a sales value.

Moreover, an aggregate transaction value analysis module 205 may comprise a third party data base sales determiner 503. A third party data base sales determiner 503 may ingest data 110, that has already be reposed in third-party databases, such as data indicative of business sales volume (e.g., number of employees, aggregate transaction values, and/or the like) and sum the factors to determine whether sales value exceeds $1 million. As such, a third-party data base sales determiner 503 may comprise an industry-indexed factor analysis module 201.

Thus, the aggregate transaction value analysis module 205 may add up aggregate transaction values from third-party data sources that are indicated to be transactions associated with the business (such as via an third party data base sales determiner 503), and may determine whether the transactions sum to a sales value floor. Upon summing to a sales value floor, the business may be tagged with an indicator of "high sales value" or upon failing to sum to a sales value floor, with an indicator of "low sales value." Moreover, aggregate transaction values may be predicted based on retrospective machine learning analysis, such as by ingesting data, making predictions as to the relative ranking of businesses, then comparing that to third party data (or later consolidated internal data) (such as by a GBM sales determiner 501).

The GBM sales determiner may further comprises an arbitration engine 505 configured to select among the output of the GBM sales determiner 501 and the third-party database sales determiner 503. For instance, in the event that third-party data is lacking, the arbitration engine 505 may deselect the third-party database sales determiner 503.

Data, as discussed herein, may include "internal data." Internal data may include any data a credit issuer possesses or acquires pertaining to a particular consumer. Internal data may be gathered before, during, or after a relationship between the credit issuer and the transaction account holder (e.g., the consumer or buyer). Such data may include consumer demographic data. Consumer demographic data includes any data pertaining to a consumer. Consumer demographic data may include consumer name, address, telephone number, email address, employer and social security number. Consumer transactional data is any data pertaining to the particular transactions in which a consumer engages during any given time period. Consumer transactional data may include, for example, transaction amount, transaction time, transaction vendor/merchant, and transaction vendor/merchant location. Transaction vendor/merchant location may contain a high degree of specificity to a vendor/merchant. For example, transaction vendor/merchant location may include a particular gasoline filing station in a particular postal code located at a particular cross section or address. Also, for example, transaction vendor/merchant location may include a particular web address, such as a Uniform Resource Locator ("URL"), an email address and/or an Internet Protocol ("IP") address for a vendor/merchant. Transaction vendor/merchant and transaction vendor/merchant location may be associated with a particular consumer and further associated with sets of consumers. Consumer payment data includes any data pertaining to a consumer's history of paying debt obligations. Consumer payment data may include consumer payment dates, payment amounts, balance amount, and credit limit. Internal data may further comprise records of consumer service calls, complaints, requests for credit line increases, questions, and comments. A record of a consumer service call includes, for example, date of call, reason for call, and any transcript or summary of the actual call.

Any communication, transmission and/or channel discussed herein may include any system or method for delivering content (e.g. data, information, metadata, etc.), and/or the content itself. The content may be presented in any form or medium, and in various embodiments, the content may be delivered electronically and/or capable of being presented electronically. For example, a channel may comprise a website or device (e.g., Facebook, YouTube®, AppleTV®, Pandora®, xBox®, Sony® Playstation®), a uniform resource locator ("URL"), a document (e.g., a Microsoft Word® document, a Microsoft Excel® document, an Adobe .pdf document, etc.), an "ebook," an "emagazine," an application or microapplication (as described herein), an SMS or other type of text message, an email, Facebook, twitter, MMS and/or other type of communication technology. In various embodiments, a channel may be hosted or provided by a data partner. In various embodiments, the distribution channel may comprise at least one of a merchant website, a social media website, affiliate or partner websites, an external vendor, a mobile device communication, social media network and/or location based service. Distribution channels may include at least one of a merchant website, a social media site, affiliate or partner websites, an external vendor, or a mobile device communication. Examples of social media sites include Facebook®, Foursquare®, Twitter®, My Space®, LinkedIn®, and the like. Examples of affiliate or partner websites include American Express®, Groupon®, LivingSocial®, and the like. Moreover, examples of mobile device communications include texting, email, and mobile applications for smartphones.

A "consumer profile," "customer data," or "consumer profile data" may comprise any information or data about a consumer that describes an attribute associated with the consumer (e.g., a preference, an interest, demographic information, personally identifying information, and the like).

In various embodiments, the methods described herein are implemented using the various particular machines described herein. The methods described herein may be implemented using the below particular machines, and those hereinafter developed, in any suitable combination, as would be appreciated immediately by one skilled in the art. Further, as is unambiguous from this disclosure, the methods described herein may result in various transformations of certain articles.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the system. As those skilled in the art will appreciate, user computer may include an operating system (e.g., Windows NT®, Windows 95/98/2000®, Windows XP®, Windows Vista®, Windows 7®, OS2, UNIX®, Linux®, Solaris®, MacOS, etc.) as well as various conventional support software and drivers typically associated with computers.

The present system or any part(s) or function(s) thereof may be implemented using hardware, software or a combination thereof and may be implemented in one or more computer systems or other processing systems. However, the manipulations performed by embodiments were often referred to in terms, such as matching or selecting, which are commonly associated with mental operations performed by a human operator. No such capability of a human operator is necessary, or desirable in most cases, in any of the operations described herein. Rather, the operations may be machine operations. Useful machines for performing the various embodiments include general purpose digital computers or similar devices.

In fact, in various embodiments, the embodiments are directed toward one or more computer systems capable of carrying out the functionality described herein. The computer system includes one or more processors, such as processor. The processor is connected to a communication infrastructure (e.g., a communications bus, cross over bar, or network). Various software embodiments are described in terms of this exemplary computer system. After reading this description, it will become apparent to a person skilled in the relevant art(s) how to implement various embodiments using other computer systems and/or architectures. Computer system can include a display interface that forwards graphics, text, and other data from the communication infrastructure (or from a frame buffer not shown) for display on a display unit.

Computer system also includes a main memory, such as for example random access memory (RAM), and may also include a secondary memory. The secondary memory may include, for example, a hard disk drive and/or a removable storage drive, representing a floppy disk drive, a magnetic tape drive, an optical disk drive, etc. The removable storage drive reads from and/or writes to a removable storage unit in a well-known manner. Removable storage unit represents a floppy disk, magnetic tape, optical disk, etc. which is read by and written to by removable storage drive. As will be appreciated, the removable storage unit includes a computer usable storage medium having stored therein computer software and/or data.

In various embodiments, secondary memory may include other similar devices for allowing computer programs or other instructions to be loaded into computer system. Such devices may include, for example, a removable storage unit and an interface. Examples of such may include a program cartridge and cartridge interface (such as that found in video game devices), a removable memory chip (such as an erasable programmable read only memory (EPROM), or programmable read only memory (PROM)) and associated socket, and other removable storage units and interfaces, which allow software and data to be transferred from the removable storage unit to computer system.

Computer system may also include a communications interface. Communications interface allows software and data to be transferred between computer system and external devices. Examples of communications interface may include a modem, a network interface (such as an Ethernet card), a communications port, a Personal Computer Memory Card International Association (PCMCIA) slot and card, etc. Software and data transferred via communications interface are in the form of signals which may be electronic, electromagnetic, and optical or other signals capable of being received by communications interface. These signals are provided to communications interface via a communications path (e.g., channel). This channel carries signals and may be implemented using wire, cable, fiber optics, a telephone line, a cellular link, a radio frequency (RF) link, wireless and other communications channels.

The terms "computer program medium" and "computer usable medium" and "computer readable medium" are used to generally refer to media such as removable storage drive and a hard disk installed in hard disk drive. These computer program products provide software to computer system.

Computer programs (also referred to as computer control logic) are stored in main memory and/or secondary memory. Computer programs may also be received via communications interface. Such computer programs, when executed, enable the computer system to perform the features as discussed herein. In particular, the computer programs, when executed, enable the processor to perform the features of various embodiments. Accordingly, such computer programs represent controllers of the computer system.

In various embodiments, software may be stored in a computer program product and loaded into computer system using removable storage drive, hard disk drive or communications interface. The control logic (software), when executed by the processor, causes the processor to perform the functions of various embodiments as described herein. In various embodiments, hardware components such as application specific integrated circuits (ASICs). Implementation of the hardware state machine so as to perform the functions described herein will be apparent to persons skilled in the relevant art(s).

The various system components may be independently, separately or collectively suitably coupled to the network via data links which includes, for example, a connection to an Internet Service Provider (ISP) over the local loop as is typically used in connection with standard modem communication, cable modem, Dish Networks®, ISDN, Digital Subscriber Line (DSL), or various wireless communication methods, see, e.g., GILBERT HELD, UNDERSTANDING DATA COMMUNICATIONS (1996), which is hereby incorporated by reference. It is noted that the network may be implemented as other types of networks, such as an interactive television (ITV) network. Moreover, the system contemplates the use, sale or distribution of any goods, services or information over any network having similar functionality described herein.

"Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand. For more information regarding cloud computing, see the NIST's (National Institute of Standards and Technology) definition of cloud computing at http://csrc.nist.gov/publications/nistpubs/800-145/SP800-145.pdf (last visited June 2012), which is hereby incorporated by reference in its entirety.

As used herein, "transmit" may include sending electronic data from one system component to another over a network connection. Additionally, as used herein, "data" may include encompassing information such as commands, queries, files, data for storage, and the like in digital or any other form.

The computers discussed herein may provide a suitable website or other Internet-based graphical user interface which is accessible by users. In one embodiment, the Microsoft Internet Information Server (IIS), Microsoft Transaction Server (MTS), and Microsoft SQL Server, are used in conjunction with the Microsoft operating system, Microsoft NT web server software, a Microsoft SQL Server database system, and a Microsoft Commerce Server. Additionally, components such as Access or Microsoft SQL Server, Oracle, Sybase, Informix MySQL, Interbase, etc., may be used to provide an Active Data Object (ADO) compliant database management system. In one embodiment, the Apache web server is used in conjunction with a Linux operating system, a MySQL database, and the Perl, PHP, and/or Python programming languages.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, Java applets, JavaScript, active server pages (ASP), common gateway interface scripts (CGI), extensible markup language (XML), dynamic HTML, cascading style sheets (CSS), AJAX (Asynchronous Javascript And XML), helper applications, plug-ins, and the like. A server may include a web service that receives a request from a web server, the request including a URL (http://yahoo.com/stockquotes/ge) and an IP address (123.56.789.234). The web server retrieves the appropriate web pages and sends the data or applications for the web pages to the IP address. Web services are applications that are capable of interacting with other applications over a communications means, such as the internet. Web services are typically based on standards or protocols such as XML, SOAP, AJAX, WSDL and UDDI. Web services methods are well known in the art, and are covered in many standard texts. See, e.g., ALEX NGHIEM, IT WEB SERVICES: A ROADMAP FOR THE ENTERPRISE (2003), hereby incorporated by reference.

Practitioners will also appreciate that there are a number of methods for displaying data within a browser-based document. Data may be represented as standard text or within a fixed list, scrollable list, drop-down list, editable text field, fixed text field, pop-up window, and the like. Likewise, there are a number of methods available for modifying data in a web page such as, for example, free text entry using a keyboard, selection of menu items, check boxes, option boxes, and the like.

The system and method may be described herein in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, Java, JavaScript, VBScript, Macromedia Cold Fusion, COBOL, Microsoft Active Server Pages, assembly, PERL, PHP, awk, Python, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JavaScript, VBScript or the like. For a basic introduction of cryptography and network security, see any of the following references: (1) "Applied Cryptography: Protocols, Algorithms, And Source Code In C," by Bruce Schneier, published by John Wiley & Sons (second edition, 1995); (2) "Java Cryptography" by Jonathan Knudson, published by O'Reilly & Associates (1998); (3) "Cryptography & Network Security: Principles & Practice" by William Stallings, published by Prentice Hall; all of which are hereby incorporated by reference.

As will be appreciated by one of ordinary skill in the art, the system may be embodied as a customization of an existing system, an add-on product, a processing apparatus executing upgraded software, a standalone system, a distributed system, a method, a data processing system, a device for data processing, and/or a computer program product. Accordingly, any portion of the system or a module may take the form of a processing apparatus executing code, an internet based embodiment, an entirely hardware embodiment, or an embodiment combining aspects of the internet, software and hardware. Furthermore, the system may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The system and method is described herein with reference to screen shots, block diagrams and flowchart illustrations of methods, apparatus (e.g., systems), and computer program products according to various embodiments. It will be understood that each functional block of the block diagrams and the flowchart illustrations, and combinations of functional blocks in the block diagrams and flowchart illustrations, respectively, can be implemented by computer program instructions.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user windows, webpages, websites, web forms, prompts, etc. Practitioners will appreciate that the illustrated steps described herein may comprise in any number of configurations including the use of windows, webpages, web forms, popup windows, prompts and the like. It should be further appreciated that the multiple steps as illustrated and described may be combined into single webpages and/or windows but have been expanded for the sake of simplicity. In other cases, steps illustrated and described as single process steps may be separated into multiple webpages and/or windows but have been combined for simplicity.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

Systems, methods and computer program products are provided. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described exemplary embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims.

Furthermore, no element, component, or method step in the present disclosure is intended to be dedicated to the public regardless of whether the element, component, or method step is explicitly recited in the claims. No claim element herein is to be construed under the provisions of 35 U.S.C. 112 (f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:
1. A method comprising:

ingesting, by a computer based system, data element source data;

generating, by the computer based system, an industry categorization array comprising industry categories;

generating, by the computer based system, a variable array comprising variables, wherein the variables include at least one of employees, payment experiences, industry index, sales amount factor, maximum available credit, average available credit, satisfactory payment experiences, square footage, total assets at zip code level, UCC filings, payment references, high sales presence indicators, legal status, presence in a higher sales database, registrations for marine vessels, registrations for a health care data bank, registrations for import-export approvals, hotel occupancies, or green card filings;

determining, by the computer based system, a relative value of the variable array of a business based on an importance factor;

comparing, by the computer based system, the relative value of the variable array of the business within the industry categorization array;

testing, by the computer based system, the relative value of the variable array to other outcomes and a related value from another source over time and after an iteration timing delay;

changing, by the computer based system, the relative value of the variable array over time, in response to the testing;

determining, by the computer based system, at least one of an industry-linked variable ranking or an industry-linked variable threshold;

correlating, by the computer based system, the relative value of the variable array and the industry categorization array; and ranking, by the computer based system, the business within an industry category according to sales value, and in response to the correlating.

2. The method of claim 1, further comprising evaluating and ranking, by the computer based system, the business according to industry-relevant factors assigned industry-dependent weights.

3. The method of claim 1, further comprising predicting, by the computer based system, the sales value of the business in response to the data element source data.

4. The method of claim 1, further comprising:
predicting, by the computer based system, the sales value of the business in response to evaluating; and
ranking, by the computer based system, non-pre-determined factors ascertained by retrospective machine learning analysis in response to ingesting the data element source data.

5. The method of claim 1, further comprising:
predicting, by the computer based system, the sales value of the business in response to evaluating; and
ranking, by the computer based system, non-pre-determined factors ascertained by retrospective machine learning analysis in response to ingesting an evaluation and the ranking of the business according to industry-relevant factors assigned industry-dependent weights.

6. The method of claim 1, further comprising:
crafting, by the computer based system, a prediction of the relative ranking of the business in response to the data element source data; and
comparing, by the computer based system, the prediction that to a third party data source.

7. The method of claim 1, further comprising crafting, by the computer based system, a prediction of the relative ranking of the business in response to an evaluation.

8. The method of claim 1, further comprising ranking, by the computer based system, the business according to industry-relevant factors assigned industry-dependent weights.

9. The method of claim 1, wherein the industry categories comprise at least two of depository institutions/insurance carriers, retail/general merchandise, manufacturing, wholesale trade durable, or legal services.

10. The method of claim 1, wherein the variable array comprises a plurality of variables that depict the sales value being high in one or more of the industry categories.

11. The method of claim 1, wherein the variable array is a gradient boosting machine (GBM) model variable array, and wherein the variables are a plurality of GBM variables.

12. The method of claim 11, further comprising:
ingesting, by the computer based system, the GBM model variable array;
sequencing, by the computer based system, the plurality of GBM variables;
associating, by the computer based system, the importance factor with each GBM variable;
assembling, by the computer based system, a parallel GBM model variable importance array comprising a plurality of GBM model variable importance values;
assessing, by the computer based system, the GBM model variable array and GBM model variable importance array;
calculating, by the computer based system, a business size prediction in response to a magnitude of at least one GBM variable weighted by at least one GBM model variable importance value; and
assigning, by the computer based system, the sales value to the business indicative of a size of the business.

13. The method of claim 1, further comprising:
adding, by the computer based system, aggregate transaction values from third-party data sources that are indicated to be transactions associated with the business; and
determining, by the computer based system, whether the transactions sum to a sales value floor.

14. The method of claim 1, further comprising selecting, by the computer based system, between a GBM model empirically-determined variable set analysis module and an aggregate transaction value analysis module.

15. The method of claim 1, wherein the computer based system includes a distributed storage system configured to direct data to a business size arbitration network host, in response to a evaluating and ranking of the business by the business size arbitration network host.

16. The method of claim 1, wherein the ranking further includes ranking the business according to industry-relevant factors assigned industry-dependent weights.

17. An article of manufacture including a non-transitory, tangible computer readable storage medium having instructions stored thereon that, in response to execution by a computer based system, cause the computer based system to perform operations comprising:
ingesting, by the computer based system, data element source data;
generating, by the computer based system, an industry categorization array comprising industry categories;
generating, by the computer based system, a variable array comprising variables,
wherein the variables include at least one of employees, payment experiences, industry index, sales amount factor, maximum available credit, average available credit, satisfactory payment experiences, square footage, total assets at zip code level, UCC filings, payment references, high sales presence indicators, legal status, presence in a higher sales database, registrations for marine vessels, registrations for a health care data bank, registrations for import-export approvals, hotel occupancies, or green card filings;

determining, by the computer based system, a relative value of the variable array of a business based on an importance factor;

comparing, by the computer based system, the relative value of the variable array of the business within the industry categorization array;

testing, by the computer based system, the relative value of the variable array to other outcomes and a related value from another source over time and after an iteration timing delay;

changing, by the computer based system, the relative value of the variable array over time, in response to the testing;

determining, by the computer based system, at least one of an industry-linked variable ranking or an industry-linked variable threshold;

correlating, by the computer based system, the relative value of the variable array and the industry categorization array; and ranking, by the computer based system, the business within an industry category according to sales value, and in response to the correlating.

18. A computer-based system comprising:

a processor; and a tangible, non-transitory memory configured to communicate with the processor, the tangible, non-transitory memory having instructions stored thereon that, in response to execution by the processor, cause the processor to perform operations comprising:

ingesting, by the computer based system, data element source data;

generating, by the computer based system, an industry categorization array comprising industry categories;

generating, by the computer based system, a variable array comprising variables, wherein the variables include at least one of employees, payment experiences, industry index, sales amount factor, maximum available credit, average available credit, satisfactory payment experiences, square footage, total assets at zip code level, UCC filings, payment references, high sales presence indicators, legal status, presence in a higher sales database, registrations for marine vessels, registrations for a health care data bank, registrations for import-export approvals, hotel occupancies, or green card filings;

determining, by the computer based system, a relative value of the variable array of a business based on an importance factor;

comparing, by the computer based system, the relative value of the variable array of the business within the industry categorization array;

testing, by the computer based system, the relative value of the variable array to other outcomes and a related value from another source over time and after an iteration timing delay;

changing, by the computer based system, the relative value of the variable array over time, in response to the testing;

determining, by the computer based system, at least one of an industry-linked variable ranking or an industry-linked variable threshold;

correlating, by the computer based system, the relative value of the variable array and the industry categorization array; and ranking, by the computer based system, the business within an industry category according to sales value, and in response to the correlating.

* * * * *